United States Patent [19]

Sloan

[11] Patent Number: 4,731,575
[45] Date of Patent: Mar. 15, 1988

[54] PREPAYMENT METERING SYSTEM USING ENCODED PURCHASE CARDS

[76] Inventor: Joseph W. Sloan, 2537-140th Ave. NW., Andover, Minn. 55304

[21] Appl. No.: 939,175

[22] Filed: Dec. 8, 1986

[51] Int. Cl.$^4$ .......................................... G01R 11/02
[52] U.S. Cl. ................................... 324/113; 235/378; 235/381; 324/116; 340/825.35
[58] Field of Search ............... 235/375, 380, 378, 381, 235/382, 382.5; 324/112, 113, 116; 340/870.02, 825.31, 825.33, 825.34, 825.35; 346/14 MR; 377/2

[56] References Cited

U.S. PATENT DOCUMENTS

| | | | |
|---|---|---|---|
| 2,019,866 | 11/1935 | Morton ................................ | 324/110 |
| 3,001,846 | 9/1961 | Franceschini ....................... | 346/14 |
| 3,380,064 | 4/1968 | Norris et al. ........................ | 346/17 |
| 3,560,715 | 2/1971 | Akamatsu ........................... | 235/381 |
| 3,778,637 | 12/1973 | Arita ................................... | 307/140 |
| 3,835,301 | 9/1974 | Barney ................................ | 235/441 |
| 3,885,130 | 5/1975 | Moulton et al. ..................... | 235/450 |
| 3,935,933 | 2/1976 | Tanaka et al. ....................... | 194/210 |
| 4,019,135 | 4/1977 | Lofdahl ............................... | 324/113 |
| 4,020,325 | 4/1977 | Pfost et al. .......................... | 235/449 |
| 4,024,379 | 5/1977 | Pfost et al. .......................... | 235/380 |
| 4,162,530 | 7/1979 | Kusui et al. ................... | 324/116 X |
| 4,240,030 | 12/1980 | Bateman et al. ........... | 346/14 MR X |
| 4,351,028 | 9/1982 | Peddie et al. ................. | 324/116 X |
| 4,575,622 | 3/1986 | Pellegrini ........................... | 235/382 |
| 4,629,874 | 12/1986 | Pugsley et al. ..................... | 235/380 |

Primary Examiner—Gerard R. Strecker
Assistant Examiner—Stephen M. Baker
Attorney, Agent, or Firm—Merchant, Gould, Smith, Edell, Welter & Schmidt

[57] ABSTRACT

A prepayment utility metering method and apparatus which uses encoded mag-stripe cards to transfer purchase information from the utility billing office to the customer's premises. The mag-stripe cards are read at the customer's premises by a microprocessor-controlled utility metering and control device which meters the utilities according to the amount purchased at the utility billing office. The value information encoded on the mag-stripe cards is comprised of the amount of the purchase coded in terms of number of shaft revolutions of the metering disk, a rate schedule for metering the value of the utilities consumed, and a special sequential password containing an encrypted combination of the consumer's account number, the consumer's site identification, and the sequence number of the current purchase. This encoding scheme for prepayment of utilities provides an effective and economical method of distributing utilities that prevents fraud and tampering. The present invention also includes a method and apparatus for providing an emergency credit to utility consumers when the prepurchased amount is exhausted. An emergency mag-stripe card is used to credit the user's account with a purchased amount of utilities adequate to tide the consumer over until the billing office opens on the next business day. The emergency mag-stripe card cannot be used more than once, and the credit amount in the meter must be replenished by a new purchase of utilities before the emergency card can be used again.

4 Claims, 5 Drawing Figures

FIG. 3
MAG-STRIPE VALUE MESSAGE
| S | PASSWORD | REVS. | FIXED | BASE | R1 | S1 | R2 | S2 | E | L |
|---|----------|-------|-------|------|----|----|----|----|---|---|
|   | 6        | 7     | 4     | 4    | 4  | 4  | 4  | 4  |   |   |
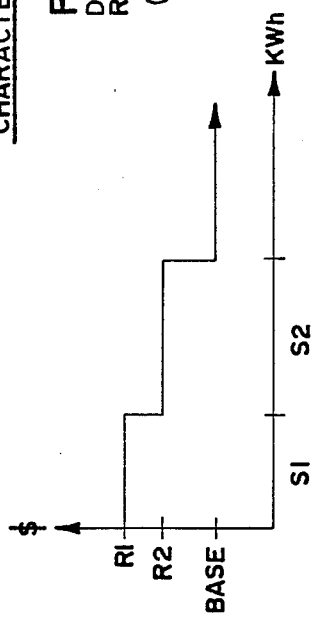
FIG. 4
DECLINING BLOCK
RATE STRUCTURE
(PRIOR ART)
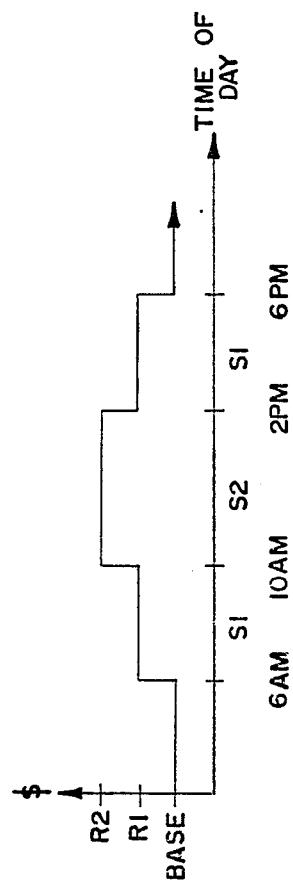
FIG. 5
TIME-OF-USE
RATE STRUCTURE
(PRIOR ART)

PREPAYMENT METERING SYSTEM USING ENCODED PURCHASE CARDS

FIELD OF INVENTION

This invention relates to prepayment utility meter units, and more particularly to a more secure method and apparatus for providing prepayment information from the utility to the customer site such that the messages are not subject to alteration, counterfeiting or fraud.

BACKGROUND OF THE INVENTION

Utility companies have historically used the method of reading meters and rendering bills as a means for collecting for electric, gas, and water service after it has been used by the customer. This is a costly and time-consuming method which is viewed with suspicion by a large number of customers, and often results in misunderstandings, disputes, late payments, and losses to the utility company due to bad debt. In addition, the customers have no ready way of reading or understanding on a daily basis the cost of the electricity, gas or water they are using. Customers generally do not know their usage status or costs until they receive a bill, which typically covers a consumption period that occurred during a period spanning 15-45 days prior to the receipt of their bill.

Prepayment metering systems have been proposed in the prior art as a technology for overcoming some of the aforementioned shortcomings. Some of these prepayment systems were designed so that the purchase of a supply of electricity, gas or water is made at a central station such as the gas or electric utility office, and the information regarding the amount of the purchase is then communicated to the customer site where the utilities are consumed. At the customer site a metering device is installed which is designed to receive the prepayment communication information and credit the user with the amount purchased at the central site. These types of proposed prepayment metering systems will reduce the overall cost of utility distribution by reducing or eliminating meter reading expenses, bad debt collection, account transfer expenses and credit department expenses, while at the same time providing a greater awareness on the consumer's part as to his or her consumption habits.

An example of a prior art utility metering device of the aforementioned type is described in U.S. Pat. No. 4,240,030 to Bateman et al., which describes a microprocessor-controlled electric utility meter which receives prepayment information on a mag-stripe card or writes postpayment information on a mag-stripe card, depending on whether the meter is in pre-payment or postpayment mode. In prepayment mode, this meter credits the user's account to the dollar amount on the mag-stripe credit card. This device includes a display that the customer can use to monitor the utility usage at the customer site on a daily basis.

While the proposed prepayment metering systems for purchasing of utilities have great advantages, the systems proposed thus far also include many disadvantages which are of particular concern especially when using a mag-stripe credit card type of communications medium between the utility and the customer site. This communicating medium is not secure, and the messages are subject to interception, analysis, alteration, or counterfeiting. In addition, the mag-stripe cards can be lost, stolen, or simply may not work the first time they are tried in the customer-site utility metering device.

The present invention overcomes these and other shortcomings of the prior art utility metering systems by providing for a simple, low-cost utility metering system based primarily on existing and off-the-shelf components and by placing the security emphasis on the credit card medium by providing a simple, low-cost method of transferring value information to the cusstomer site. The present invention uses an encoding scheme and relies on other mechanical and monitoring devices to bolster the overall security of the system.

SUMMARY OF THE INVENTION

According to the present invention there is provided a prepayment metering sdstem for dispensing utilities using mag-stripe cards. A billing and accounting computer in the utility office is used for encrypting a value message which is written onto the mag-stripe of a mag-stripe card. The value message contains information relating to the amount of utilities purchased by the customer, the utility rates, and a unique password formed by the combination of a customer account number, a site identification number, and a sequential transaction number. The mag-stripe card is carried by the consumer to the consumer's home or office and inserted into a mag-stripe card reader attached to a microprocessor-based utility control device. This utility control device is capable of reading and decoding the mag-stripe card and storing the value information into memory for use in monitoring the utility usage of the customer and disconnecting or connecting the utility based on the amount of utilities purchased.

The present invention also provides a method and apparatus for using an emergency mag-stripe card to provide a purchase credit in case the purchased amount of utilities is exhausted. The emergency mag-stripe card is encoded with a special password which allows it to be inserted into the mag-stripe reader of the consumer's utility control device to credit an amount of utilities to prevent the utilities from being disconnected. Once the emergency mag-stripe card is used to credit an amount of utility usage, the utility control device sets an internal lockout flag to prevent re-reading of the emergency mag-stripe card. The lockout flag is removed when a mag-stripe card containing a purchased value of utilities is inserted into the card reader device sufficient to cancel the amount credited by the emergency mag-stripe card.

BRIEF DESCRIPTION OF THE DRAWINGS

The invention will be described in more detail by way of example with reference to the accompanying drawings in which like numerals refer to the same components throughout the several views, wherein:

FIG. 3 is a graphic description of a value message as it is encoded on a mag-stripe card;

FIG. 4 is a graph representing a typical declining-block rate structure; and

FIG. 5 is a graph representing a typical time-of-use rate structure.

DETAILED DESCRIPTION OF THE PREFERRED EMBODIMENT

In the preferred embodiment of the present invention, a conventional off-the-shelf induction disk electric utility meter is attached to a utility meter extension sleeve, also commonly available as an off-the-shelf device, which incorporates an integral disconnect switch. The utility meter is designed with an integral photoelectric cell to measure shaft revolutions of the metering disk. The disconnect switch is a 200-amp relay which can be remotely controlled by the indoor display and control box. This indoor display box is attached inside the customer premises and connects to the meter socket extension sleeve and the induction disk utility meter by means of a small 4-conductor cable. The indoor display box includes a mag-stripe card reader and a microprocessor-controlled systems to provide for status display and system control.

The mag-stripe cards are used to convey encoded and encrypted value and account information to the customer's premises using ANSI standard mag-stripe type credit cards. These cards are written at the utility site with a commonly available mag-stripe card writer attached to an accounting computer which records the customer purchases. The accounting computer and the indoor display and control box at the customer site are both prorammed with identical encryption/decryption algorithms to provide for a secure method of transferring value information. The mag-stripe card is recorded with a minimum amount of necessary information for conveying said value information, which includes a sequential password known only to the transmitting and receiving stations so that value mag-stripe cards cannot be reused, and lost or stolen mag-stripe value cards can be replaced without fear of fraud. The sequential passwords are derived as a combination of the user account number, customer site ID, and sequence number of transactions. This information can be encoded into a password using a variety of mathematical algorithms and truncated to a unique non-repeating password.

This technique for the encoding and encrypting of value password information is simple and economical to implement, but highly effective in its security since the environment in which this system is to be used is already secured by other seurity devices and measures. Residential and commercial utility meters are already secured with tamper-indicating tabs which are periodically checked for tampering. In addition, since conventionally available utility meters are used in this application, the mechanical dials indicating utility usage are still in place, and can be periodically read by a service person from the utility company to verify the account information on record at the utility site.

Figure 1:
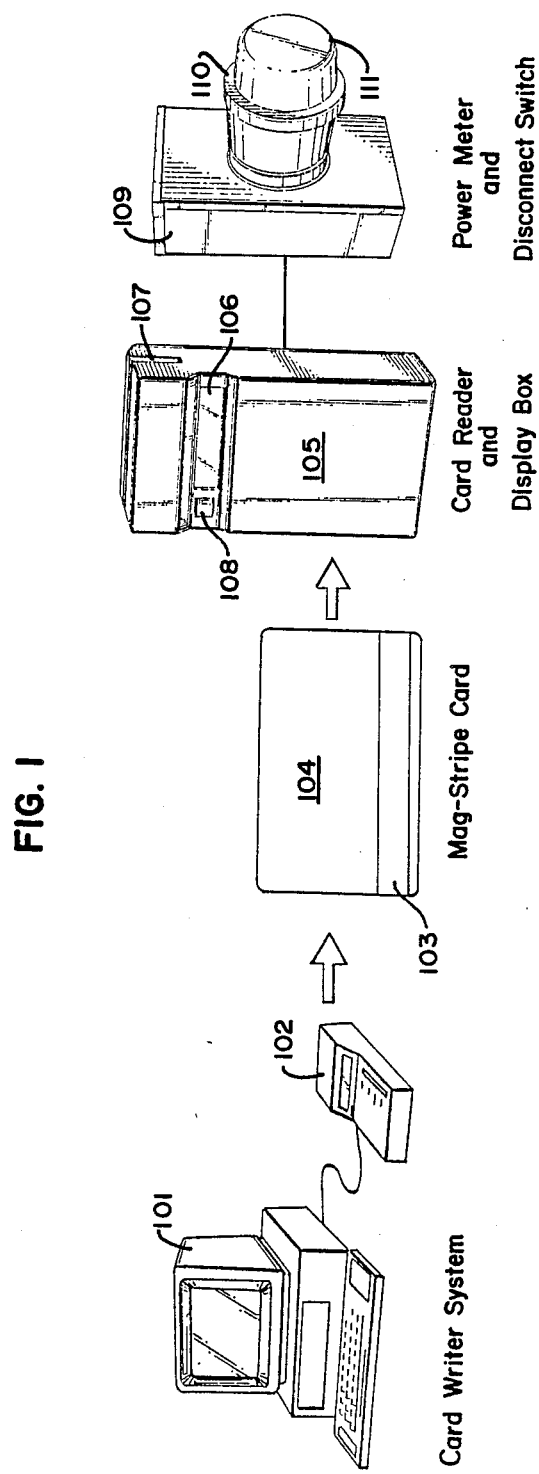
FIG. 1 is a pictorial diagram showing the main components in the prepayment metering system.

The prepayment metering system is shown in a pictorial block diagram in FIG. 1. Computer 101 and mag-stripe card writer 102 comprise the card writer system located at the utility billing and collection office. Computer 101 is programmed to operate card writer 102 to encode the mag-stripe cards 104 with the value message including the encoded sequential password onto the mag-stripe of the mag-stripe card 104. In the preferred embodiment, computer 101 is an IBM PC or equivalent small business computing system programmed to handle the billing and other accounting information associated with the utilities customers. The small business computer 101 is also programmed to encode the purchase information into a value message for encoding onto the mag-stripe 103 of mag-sripe card 104. This encoding technique, discussed more fully below, contains all the necessary information for controlling the customer's utility meter at the customer site.

Mag-stripe card writer 102 is in the preferred embodiment a Mag-Tek MT-80 card writer available from Mag-Tek, Inc., Carson, California. The card writer is connected to the serial port of card writer system 101, which in the preferred embodiment is an IBM-type PC. The software programmed on computer 101 controls the mag-stripe card writer and writes the necessary value information onto the mag-stripe card when it is passed by hand through the slot in the card writer 102. The purchase information is typed on the keyboard by the operator of the PC and the calculations necessary to construct the value message are computed and stored in the memory of computer 101. The software allows the utility to select and use one or more of several rate structures including flat rates, inverted rates, declining block rates, conservation credits, and time of day rates.

The mag-stripe card 104 with the encoded information written onto mag-stripe 103 is given to the purchaser, who carries the card to the customer site for insertion into card reader and display box 105. The mag-stripe card in the preferred embodiment is a 12-mil plastic-coated paper card similar to a credit card. The mag-stripe card conforms to the ANSI standard for magnetic stripe encoding for credit cards (ANSI Standard X4.16-1976). This standard defines standards for use on several tracks of magnetic stripes on credit cards and the format to be used on each. In the preferred embodiment of the present invention, track 2 of the mag-stripe is used according to the ANSI standard, which allows a recording density of 75 bits/inch. Since the nominal length of the mag-stripe is a minimum 3.135 inches, at least 40 numeric characters encoded using a 4-bit subset of binary coded decimal (BCD) with odd parity can be encoded on the card. Along with this BCD data, the mag-stripe must contain the necessary sentinels at the beginning and ending of the data fields for the proper reading and writing of the encoded data. By conforming the mag-stripe card data encoding scheme to the ANSI standard for mag-stripe cards, off-the-shelf types of mag-stripe card writing systems such as the Mag-Tek MT-80 card writer can be used at a minimum cost.

The mag-stripe card 104 is carried to the customer site where it is inserted into slot 107 of card reader and display box 105. This box is mounted on a wall inside the customer's premises at any location designated by the customer. The top slot through which the mag-sripe card is passed contains a small mag-stripe card reader which receives the encoded information from mag-stripe 103 and stores it into a microprocessor-based system. A push button 108 is included on the card reader and display box 105 which is used to select information to be displayed on 7-segment LED display 106. In the preferred embodiment, five display functions can be selected for display on display 106 which are sequentially selected from 1 through 5 by sequentially pressing display button 108. In the preferred embodiment, the displayed functions are: the dollar amount remaining in escrow; the present use in dollars per hour; the amount used yesterday; the amount used last month; and the dollar amount last purchased.

The card reader and display box 105 contains a microprocessor-based system, more fully discussed below, that is used to control the power flowing from the utility lines to the customer's premises through utility box 109. These types of utility boxes are found on all commercial and residential buildings and include a meter socket for the insertion of meter 111 which measures and monitors the amount of power used by the customer. A six-inch sleeve 110 is installed between the meter 111 and the meter socket contained in box 109. This sleeve 110 contains an ASCO 913 switch suitable for service entrances up to 200 amps and available from The Automatic Switch Company, Flocham Park, N.J. If the electric supply is allowed to drop to zero, or if the electronic circuitry is tampered with, either in the meter box 109 or the card reader and display box 105, the switch will open and disconnect the power. The switch is not affected and remains closed during a power failure.

Meter 111 is a standard meter which is modified with a pattern of black stripes on the bottom of the rotating disk. A photoelectric sensor is mounted below the disc and small cables are used to connect the sleeve 110 to the photosensor and to the display box 105 inside the premises. The cable installation is similar to a telephone or cable TV installation. Meter 111 is a commmonly available meter with the photoelectric sensor already built in and available from Westinghouse Electric Corporation. Since this is a modified standard electric meter, the mechanical register of the meter can be compared to sales records to resolve any questions over the amount of electricity paid, or for detecting a failure in the electronics or to detect fraud in tampering with the electronic operation of the system. Thus the mechanical register on the meter 111 serves as an additional level of security for this system.

Figure 2:
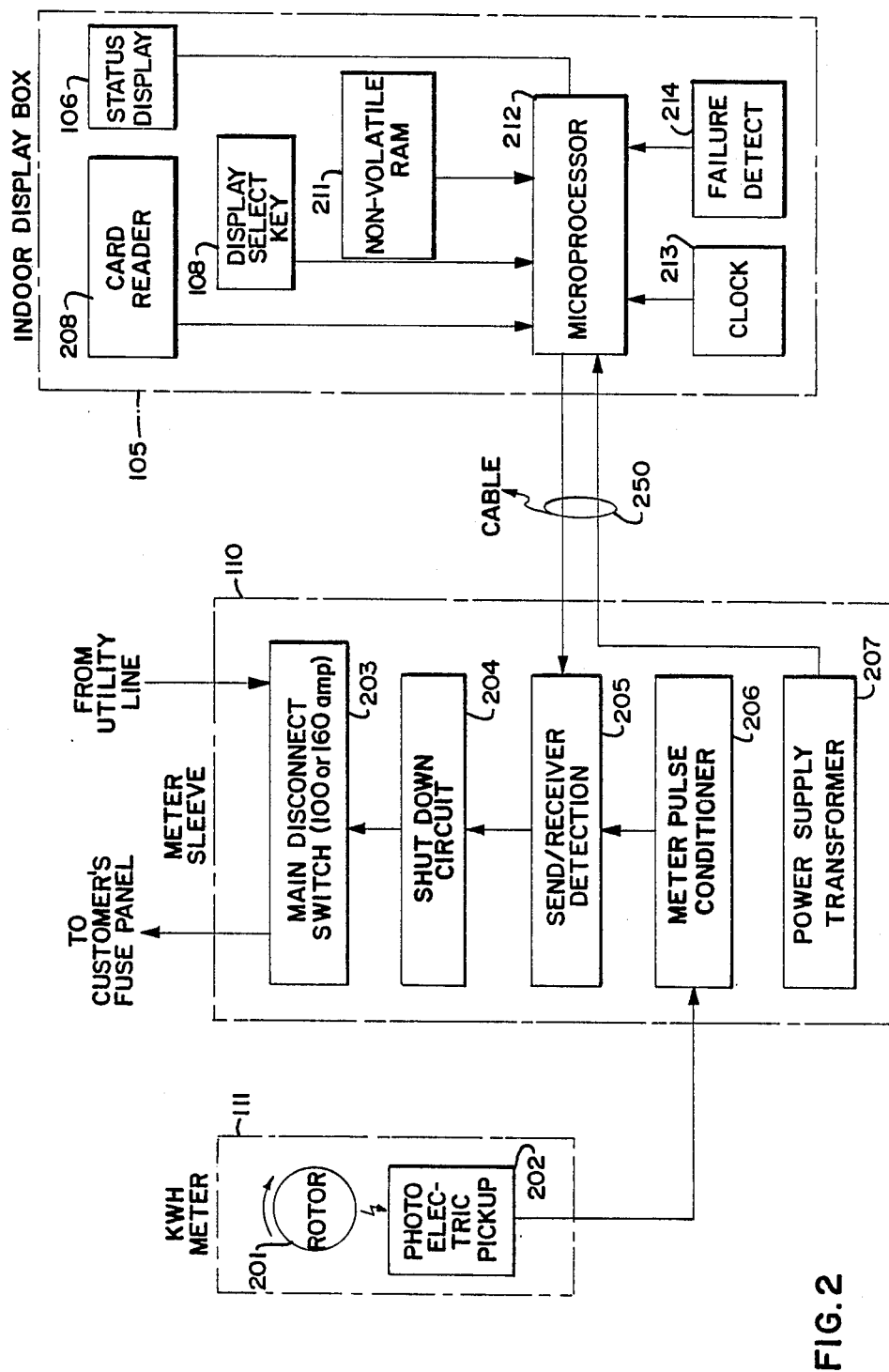
FIG. 2 is a block diagram of the control electronics located at the customer premises for accepting the prepayment mag-stripe cards and controlling the electric supply to the customer's equipment.

FIG. 2 shows the details of the operation of the card reader and display box 105, the electronic circuits within meter sleeve 110, and the modifications to meter 111. Electric meter 111 shown in the dashed box to the left of FIG. 2 is a standard rotating disc electric meter. The rotor 201 has reflective strips attached which are sensed by photoelectric pickup 202 as pulses indicating the number of rotations on rotor 201. These pulses are sent to the electronic circuitry within meter sleeve 110 and received by meter pulse conditioner 206. The pulses indicating the rotation of rotor 201 are sent by meter pulse conditioner 206 to the send or receive detection circuit 205 for transmission over cable 250 to microprocessor 212 contained in the indoor display box 105. Microprocessor 212 receives the pulses indicating electric usage and uses this information to debit the consumer's account contained in nonvolatile RAM 211. The consumer's account contained in RAM 211 is credited by receiving the value message information on mag-stripe card 104 through card reader 208. This information is taken by microprocessor 212 and used to credit the account contained in RAM 211. In this fashion a small accounting office is established within the consumer's premises, eliminating the need for central site billing, recording and accounting at the utility office.

The microprocessor is capable of displaying the status of the user's account contained in RAM 211 by means of status display 209. As was previously described, status display 209 is capable in the preferred embodiment of displaying five different reports regarding the user's account by means of display select key 108.

The microprocessor is capable of selecting different rate schedules depending upon the information received from the mag-stripe card 104 through card reader 208.

Time of day is constantly maintained by clock circuit 213 and fed to microprocessor 212. This clock circuit is implemented in the preferred embodiment along with the nonvolatile RAM 211 in a self-contained circuit available from Dallas Semiconductor in Dallas, Tex. This circuit contains a lithium battery backup which powers the RAM 211 and the clock circuit 213 in the event of a power failure. The estimated shelf life of the aforementioned circuit is approximately ten years, allowing the microprocessor memory to survive power failures and continue to maintain its memory and correct time. The microprocessor constantly compares the time from clock 213 with the 60-Hz power signal received over cable 250 to maintain the accuracy of clock 213. The frequency control over the 60-Hz power line is extremely accurate over the long term and allows for a more accurate recording and maintenance of time than clock 213 is capable of. Microprocessor 212 therefore continually updates and maintains the accurate time based on a comparison of clock 213 to the 60-Hz line frequency.

Electronic circuits contained in indoor display box 105 and within meter sleeve 110 are powered off the AC power line through power supply transformer 207. This power is transferred by cable 250 to indoor display box 105 for powering the circuits therein. In the event of a power failure, the status display 106 will go blank, indicating that there has been a power failure somewhere outside the customer's premises. Failure detect circuit 214 serves to monitor the status of the AC power line and of the operation of the microprocessor to detect failures in the system and to select recovery modes. Any tampering with cable 250, meter sleeve 110 or electric meter 111 will be detected by the indoor display box 105 through failure detect circuit 214. A failure or tamper detect signal recorded by microprocessor 212 will cause a signal to be sent over cable 250 to send-/receiver detection circuit 205 to cause the shutdown circuit 204 to open main disconnect switch 203. This switch in the preferred embodiment is a 100-amp or 160-amp relay switch which controls the power from the utility line to the customer's fuse panel. Main disconnect switch 203 will also be used to disconnect power from the utility line to the customer's fuse panel if the customer's account contained in RAM 211 falls to zero. In that event, microprocessor 212 will disconnect power to the customer's premises until a new mag-stripe 104 is inserted into card reader 208 to credit the user's account in RAM 211.

The operation by the consumer of the prepayment metering system at the customer site is quite simple, and operates as follows. The customer purchases any amount of electricity at any time that he or she desires, either by mail or in person at the electric utility accounting office. The coded mag-stripe card is then carried to the user's premises and passed through the slot 107 on the top of the display box 105 to load the purchase into the meter. The cards will work only for the meter for which they are issued, since the information encoded on the cards, discussed more fully below, is encoded using the customer's account number and a site identification number.

When the card is passed quickly through the slot 107 on top of the display box 105, a tone should sound and the numbers on the display will change to show the dollar amount of the purchase. If the tone does not sound, then the user simply passes the card through the slot again. The information on the mag-stripe card is not destroyed when passing through the card reader on slot 107, and the card may be repeatedly run through the card reader in its attempt to load the necessary accounting information. However, once the information from the mag-stripe card 104 is loaded into microprocessor 212 and stored in RAM 211, the card is useless since part of the encoding scheme used, discussed more fully below, is a sequential password which prohibits reusing the same card more than once. If the card is damaged, destroyed, lost or for some reason does not work in the card reader 105 at the customer's premises, a new card can easily be issued using the identical sequential password without any fear of fraud, since once the card is used with the sequential password, it cannot be used again, nor can any duplicate thereof.

FIG. 3 is a graphic representation of the data fields in the value message encoded on the mag-stripe card. This information is recorded on track 2 of the ANSI standard mag-stripe card and contains all the necessary value information for controlling the consumer's prepayment metering system. The value message is encoded with START and END sentinels, as shown in FIG. 3, to aid the card reader 208 in decoding the information recorded on the mag-stripe. The fields are described below, and take up the amount of character space indicated in FIG. 3.

Electric energy as sold and distributed by electric utilities is measured in kilowatt-hours (kWh). Utility meters used by utility companies typically make use of an induction-driven disc connected to a rotating shaft to measure the quantity of energy used. Various devices are available and are being used in this and other applications to detect the disc revolutions, including photoelectric means. One of the off-the-shelf induction disc electric meter with this capability built in is manufactured by the Westinghouse Electric Corporation. The photoelectric circuitry is used to sense the rotation of the disc, and produces one or more digital pulses per disc revolution. When these pulses are counted they can be mathematically converted into kilowatt-hours of energy used. A typical conversion factor is 7.2 watt-hours (0.0072 kWh) per disc revolution, used on industry-standard meters labeled $K_h = 7.2$.

In the preferred embodiment of the present invention, it is most convenient to convert the dollar value of the purchase to an equivalent number of disc revolutions. This is accomplished as follows:

| Dollar Value | D = $50.00 |
| Electric Rate | R = $0.06 per kWh |
| Meter $K_h$ | K = 0.0072 kWh per disc revolution |
| Number of Revolutions | $N = \frac{D}{R \times K}$ |

When the values are substituted in the above equation and the calculation completed, the number of disc revolutions equivalent to $50.00 is found to be 115,741 (rounded). This number represents the quantity of the purchase. It is digitally encoded and made part of the value message shown in FIG. 3 in the field labeled REVS. When this information is received by the indoor display box 105, this value is added to the value contained in the "Amount Remaining" memory register contained in nonvolatile RAM 211. This is a credit register contained in RAM 211 and debited by the microprocessor as electricity is used by the consumer.

The second essential element of the value message shown in FIG. 3 is the base rate indicated by the 4-character field BASE. This portion of the value message is the rate per kWh expressed in dollars per disc revolution. This base rate is readily calculated from the factors given above when using the following formula: $B = R \times K$.

When the values are substituted and the calculations completed using the above figures, the dollars per disc revolution are found to be 0.00432. This value is made a part of the value message and recorded onto the mag-stripe card 104. When this information is received by the card reader 208 of the indoor display box 105, the value is written into its assigned memory register contained in nonvolatile RAM 211. If the new base rate is different from the old base rate from a previous transaction, the new value replaces the old value. This is the method by which a change in electric rates (tariffs) is communicated from the utility office to the remote metering device. It has the effect of repricing any unused disc revolutions previously purchased and recorded in the indoor display box 105.

The utility rate structure (tariff structure) may include different costs for different blocks of energy used within specified time periods, such as with declining block, inverted, and time-of-use rates. These other rate levels can be stored in the value message and are expressed as percentages of the base rate. These additional rates are shown in FIG. 3 as represented by R1 and R2. It will be appreciated by those skilled in the art that additional rate structures can be encoded onto mag-stripe cards limited only by the amount of information that the mag-stripe could contain. The number of energy units kWh in each rate block is converted to an equivalent number of shaft revolutions and encoded and inserted as still other segments of the value message, as shown in FIG. 3 as S1 and S2. Thus, for "rate 1" (R1) there is a "stage 1" (S1) to indicate when rate R1 is in effect. The same is true for rate R2, whereby stage S2 determines when rate R2 is in effect.

To illustrate a rate (tariff) which contains two energy rate steps, assume that the first 600 kW used each month cost $0.075/kWh and all additional energy costs $0.06/kWh. The same formula ($B = R \times K$) may be used to calculate the "first block" rate in dollars per disc revolution, which in this case is found to be $0.00540. This value is encoded and placed in a separate designated segment of the value message shown as the 4-character field R1 in FIG. 3. When this rate is received by the indoor display box 105, it is stored by the microprocessor 212 in its assigned memory register contained in RAM 211 for use during the time when electricity is being used from the first block. The preferred method, however, calculates, transmits and stores the values of the block rates as percentages of the base rate. This is done to simplify the calculations within the utility office computer 101 and the microprocessor 212. Hence, in the above example, $0.075/kWh is 125% of the base rate $0.06/kWh.

In addition to the different rate structures when multiple block rates are used is the establishment of a method of the remote metering device to know when to charge off the energy at the higher first block rate and when to use the lower end block rates. This is done using the stage information contained in the S1 and S2 fields, as shown in FIG. 3. These stages are done by calculating the monthly block into daily blocks by dividing by a 30-day month. Thus, a monthly block of 600 kWh is converted to a daily block of 20 kWh by simply dividing by 30. Then the 20 kWh is converted to an equialent number of disc revolutions by the following formula:

$$\frac{20 \text{ kWh}}{0.0072 \text{ kWh}/rev} = 2{,}778 \text{ disc revolutions}$$

This number of disc revolutions is encoded and placed in its designated segment of the value message shown in FIG. 3 as S1. When it is received by the remote metering device, this value is stored by the microprocessor 212 in its assigned memory register within the nonvolatile RAM 211. At the beginning of each 24-hour period this value is moved into an assigned working register where it is decremented at each revolution until it reaches zero. As long as its value is not zero, the remote microprocessor 212 uses the first block energy rate in reducing the value in the "amount remaining" register. Any time that this value is zero, microprocessor 212 uses the base rate value when reducing the value in the "amount remaining" register.

The conversion from a monthly rate structure to a daily rate structure is not essential to the operation of the prepayment metering system, but is done to accomodate the prorating generally required by regulatory bodies when a billing period covers less than a full month. The above procedure is repeated as many times as is necessary to accomodate the number of steps in the utility's rate structure. At the beginning of each 24-hour period, the microprocessor program moves up to the top of the block rate sequence and works its way down through each block until it reaches the end rate or base rate. The whole procedure is reset by the beginning of the next new day.

When a time-of-use rate schedule is being used, the values for the peak, shoulder and off-peak rate levels are calculated and stored in the same manner as for the aforementioned and -described declining block and inverted rates. However, the internal calendar clock directs the microprocessor to the apropriate value to be used in reducing the value in the "amount remaining" register. Hence, the stages S1 and S2 as shown in FIG. 3 contain time values rather than number of revolutions for determining stages in a time-of-use rate structure.

FIGS. 4 and 5 are examples of different rate structures using declining block and time-of-use, respectively. In the declining block rate structure shown in FIG. 4, rate 1 is in effect for stage 1, which is determined by the number of kilowatt-hours consumed by the customer. For example, stage 1 could be a rate of 114% of the base rate lasting for the purchase of the first 900 kWh. The second stage could be a rate representative of 106% of the base rate lasting for the second 900 kWh. All the additional kilowatt-hours would be priced at the base rate. Thus, the declining block rate structure rewards consumers for increased use of electricity by declining their purchase amounts. Those skilled in the art will readily recognize that an inverted block rate structure would reward conservation on the part of the consumer by providing a rate level below the base rate for the first stage of consumption.

The microprocessor-based system of the control circuits contained in the display box 105 could be programmed to allow a time-of-use rate structure similar to the type shown in FIG. 5. The different stages for which the different rates apply could be based on the time of day that the user consumes electricity. For example, in FIG. 5, the base rate applies up to 6:00 a.m. From 6:00 a.m. until 10:00 a.m., rate 1 would apply, and stage 1 would be represented by a four-hour period. Rate 2 would apply from 10:00 a.m. to 2:00 p.m. to reflect the peak usage hours during the day. Stage 2 would be set to be that time period, and rate 2 would apply therefor. Rate 1 would begin again at 2:00 p.m. and last until 6:00 p.m., represented by the time period stage 1. After 6:00 p.m., the base rate would apply throughout the evening hours.

In addition to the fields described above for storing and encoding into the mag-stripe value message shown in FIG. 3, the fixed-rate field is used to store and record the various fixed monthly charges that electric utility rate structures typically allow. These fixed monthly charges are in addition to the demand and energy charges and include a fixed monthly charge billed to all customers regardless of how much or how little energy is used. These charges are typically associated with unmetered lighting installations, and in some cases fixed credits may be a regular part of the rate structure, particularly with some end use load management programs where the utility is allowed to remotely control the operation of certain consumer appliances during periods of peak system demand.

To convert and store the fixed rate into the field shown in FIG. 3, the monthly dollar amount assigned to the fixed rate is converted to a daily dollar amount by dividing by 30. The following formula is then used to calculate the number of revolutions assigned to the fixed rate:

| Daily Fixed Charge | F = $0.20 |
| Base Electric Rate | R = $0.06 per kWh |
| Meter $K_h$ | K = 0.0072 kWh per disc revolution |
| Number of Revolutions | $N = \frac{F}{R \times K}$ |

When the values are substituted and the calculations completed, the number of disc revolutions (N) equivalent to the daily fixed charge is 463 (rounded). This number is digitally encoded and placed in its designated segment of the value message marked "fixed", shown in FIG. 3, and stored as a 4-character numeric BCD field.

The last and most important field shown in the mag-stripe value message in FIG. 3 is the sequental password shown as a 6-character field. The authenticity of each message delivered to the remote metering site is validated by this sequential password which changes following each transaction or transmission. The next valid sequential password is an encrypted code known only by the transmitting device and the receiving device. The sequential password is encoded and formed by the computer 101 in the utility billing office. The microprocessor 212 contains an identical algorithm for decoding the sequential password and sensing its authenticity. The number of elements used and the construction of the formula may vary between users, but typically there would be at least three elements in the formula, such as (1) the consumer's account number; (2) a site identification number, which is randomly generated and automatically assigned by the central station computer 101 at the utility billing office at the time the meter is installed; and (3) the sequential number of the transaction or communication that is taking place. Each element is used one or more times in the formula as a term factor or exponent.

The formula generates a string of numbers or characters, some or all of which may be used in the password. Typically, five to ten numbers or characters will be used, depending upon the degree of security required. In the preferred embodiment only numbers are used, and a six-character password is stored in the first field, as shown in FIG. 3. The specific numbers or characters selected for the password may be a single segment from the generated string or two or more concatenated segments from the string. Further, the numbers or characters may appear in the communicated message as a single group of consecutive numbers or characters or as individual or small groups of numbers or characters embedded at different preselected locations in the message. For instance, the password may be distributed such that two characters are found between the REVS and the FIXED field, two characters between the FIXED and BASE fields, with the remaining characters distributed between the R1, S1, R2, S2 fields. In the preferred embodiment of the present invention, the password appears as one contiguous group of characters after the start sentinel of the value message shown in FIG. 3.

The sequential password allows the administering authority to transmit a duplicate message without regard to whether or not the original message was actually received and utilized. Once a valid message has been received and the value loaded into the card reader and display box 105, the same password will not be accepted a second time. Since an original message and a duplicate message both carry the exact same sequential password, when either one is used the other becomes invalid and the message will be rejected. Thus, any attempt to defraud the system through a false claim will not succeed.

The following is a simple illustration for the generation of sequential passwords. There are virtually an unlimited number of such formulas and elements which may be employed to protect a communication system from fraudulent or counterfeit messages. However, in the preferred embodiment of the present invention, the simple algorithm described below is used which provides an adequate amount of security in the present environment, recalling that other security measures already implemented by utility companies to prevent fraud serve as a backup security system or additional levels of security which allows the sequential password algorithm to be of a moderate security type. In the preferred embodiment of the present invention the following formula is used.

| Account Number | A = 1243160011 |
| Site ID (Random) | R = 2874 |
| Transaction Number | T = (variable integer) |
| Password String | S = (A + R + (T × R)) / T |
| Password | P = the last six significant digits of S after rounding to the nearest whole number. |

When the same account number, site ID random number and formula are installed in both the utility company computer 101 and the customer site microprocessor 12, and each has the capability of counting and keeping track of the transaction numbers, each can generate the same sequential password that will be used for the next transaction. The card reader and display box 105 will compare the password from any received message with the next sequential password generated internally by its installed formula. If the passwords do not match, the data carried by the message will be rejected as not valid and the consumer will be presented with an "invalid password" error message.

Applications for this system are particularly suited to monthly utility transactions where the extraordinary efforts needed to decypher or break the simple code would not be practical or worthwhile because of the relatively few transactions, the modest monetary value of each transaction, and periodic auditing procedures which would not allow the efforts to defraud to go long undetected.

The completed value message in its simplest form is a string of numbers somewhat as follows:

| Password | Revolutions | Fixed Rate | Base Rate | Rate 1 | Stage 1 |
|---|---|---|---|---|---|
| 1 6 5 7 5 9 | 1 1 5 7 4 1 0 | 4 6 3 0 | 4 3 2 0 | 5 4 0 2 | 7 7 8 0 |
| Rate 2 | | | Stage 2 etc. | | |
| 0 0 0 0 | | | 0 0 0 0 . . . | | |

The order in which the number segments or fields appear may vary from system to system, but once the format is installed in a remote metering device such as the card reader and display box 105, it generally remains fixed for the sake of simplicity. If a greater security is desired, the password could be fragmented with individual or small groups of digits embedded at different preselected locations in the message, or the order of the string could be shifted, reversed, interchanged, or otherwise varied in a preprogrammed order throughout a series of transactions in order to complicate efforts to analyze and decypher the sequential password system.

The system described above would normally preclude the use of a standby or reserve supply card because it would not bear a valid password. This is resolved by programming the microprocessor 212 of the card reader and display box 105 to accept either the next sequential password or the special alternate password encoded on the reserve supply card. If at any time the alternate password is detected from a reserve supply card, the microprocessor 212 sets a "blocking flag" that disallows further acceptance of the alternate password until a subsequent regular purchase card with the next sequential password is used, provided that the subsequent purchase has a greater value than the value of the reserve supply card. When the value of a subsequent regular purchase is greater than the value of the reserve supply card, the value of the new purchase appears to be diminished by an amount equal to the original value of the reserve card because only the net value is loaded into the receiving remote meter. The balance of the new purchase value is effectively, although not physically, transferred to the reserve supply card by removing the blocking flag on the reserve card's alternate password.

This procedure has the effect of allowing a user an emergency credit card or reserve supply card. The use of a subsequent sequential password on a purchase card has the effect of revalidating the reserve supply card so that it can be used again. The reserve supply card can be used any number of times so long as it is revalidated following each use by subsequent regular purchase of greater value. The alternate password would typically consist of some or all of the numbers or characters in the account number, but may be any string of numbers or characters derived in a manner similar to the sequential password but using a different formula.

Although the preferred embodiment of the present is described above in the form of an electric utility meter, the application of this invention to natural gas utilities, water systems or other connected utilities would follow the same outline with appropriate changes in terminology. Thus, it will be appreciated by those skilled in the art that the present invention both in spirit and scope applies to the application of the prepayment metering system using encoded purchase cards to other utilities.

Although specific computational configurations and electrical configurations have been illustrated and described for the preferred embodiment of the present invention, it will be appreciated by those of ordinary skill in the art that any conventional computational, logical or electrical arrangements which are calculated to achieve the same purpose may be substituted for the specific configurations shown. For example, hard-wired control sequences such as Programmable Logic Arrays (PLA's) could be substituted for the computer or microprocessor without departing from the spirit of the invention. Also, it will be appreciated by those skilled in the art that bar-coded or UPC-type cards may be substituted for the mag-stripe cards described herein. It will likewise be understood that many modifications will be readily apparent to those of ordinary skill in the art, and this application is intended to cover any and all adaptations or variations thereof. Therefore, it is manifestly intended that this invention be limited only by the claims and the equivalents thereof.

What is claimed is:

1. A prepayment metering system for dispensing utilities using mag-stripe cards, comprising:
   first control means for encrypting a value message;
   mag-stripe card writer means electrically connected to said first control means for writing said encrypted value message onto the mag-stripe cards;
   mag-stripe card reader means for reading said encrypted value message from the mag-stripe cards;
   means for sensing utility usage;
   utility disconnect means for connecting and disconnecting the utilities;
   second control means electrically connected to said mag-stripe card reader means, said means for sensing utility usage and said utility disconnect means, said second control means operable for (1) decrypting said value message, (2) storing said value message into a memory, (3) monitoring utility usage, and (4) disconnecting and connecting the utilities in response to the utility usage and said value message; and
   said encrypted value message comprising:
      purchased value component having a monetary value;
      rate component having a value corresponding to the cost of utilities purchased; and
      password formed by a combination of a customer account number, a site identification number, and a sequential transaction number.

2. The system according to claim 1, wherein said value message further includes one or more additional rate components corresponding to a rate structure different from said rate component; and
   one or more stage components operable for specifying when said additional rate should apply.

3. A method of vending utilities, comprising:
   (a) receiving advance payment at a vending site in exchange for utility usage at a consumption site;
   (b) forming an encrypted password by combining a purchaser's account number, a purchase sequence number, and a site identification number in a mathematic algorithm;
   (c) writing a mag-stripe card at the vending site with the value of the payment, a utility rate schedule, and the encrypted password;
   (d) transporting the mag-stripe card to the consumption site and inserting said card into a utility control device;
   (e) reading said mag-stripe card and decoding said password; and
   (f) controlling the consumption of utilities through the utility control device according to the information written on said mag-stripe card.

4. The method according to claim 3 further including the steps of:
   (g) writing an emergency mag-stripe card at the vending site with the value of a purchase credit;
   (h) transporting the emergency mag-stripe card to the consumption site and inserting said emergency mag-stripe card into said utility control device;
   (i) reading and decoding said emergency mag-stripe card;
   (j) setting a lockout flag to prevent re-reading of said emergency mag-stripe card;
   (k) controlling the consumption of utilities through said utility control device according to the credit information written on said emergency mag-stripe card; and
   (l) removing said lockout flag to allow the reuse of said emergency mag-stripe card upon the reading of said mag-stripe containing the value of payment which exceeds the value of credit on said emergency mag-stripe card.

* * * * *